(12) United States Patent
Locke et al.

(10) Patent No.: US 10,380,471 B2
(45) Date of Patent: Aug. 13, 2019

(54) DYNAMIC TRANSACTION CARD POWER MANAGEMENT

(71) Applicant: Capital One Services, LLC., McLean, VA (US)

(72) Inventors: Tyler Locke, Washington, DC (US);
David Wurmfeld, Fairfax, VA (US);
James Zarakas, Centreville, VA (US);
Adam Koeppel, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 171 days.

(21) Appl. No.: 15/098,935

(22) Filed: Apr. 14, 2016

(65) Prior Publication Data

US 2016/0308371 A1    Oct. 20, 2016

Related U.S. Application Data

(60) Provisional application No. 62/266,324, filed on Dec. 11, 2015, provisional application No. 62/270,307, filed on Dec. 21, 2015, provisional application No. 62/305,599, filed on Mar. 9, 2016, provisional application No. 62/147,568, filed on Apr. 14, 2015.

(51) Int. Cl.
| | | |
|---|---|---|
| *G06K 19/07* | (2006.01) | |
| *H02J 7/02* | (2016.01) | |
| *G06K 19/077* | (2006.01) | |
| *H02J 7/34* | (2006.01) | |
| *H02J 50/00* | (2016.01) | |

(52) U.S. Cl.
CPC ..... *G06K 19/0701* (2013.01); *G06K 19/0704* (2013.01); *G06K 19/07707* (2013.01); *H02J 7/025* (2013.01); *H02J 7/345* (2013.01); *H02J 50/00* (2016.02)

(58) Field of Classification Search
CPC .......................... G06K 19/07707; H02J 7/345
See application file for complete search history.

(56) References Cited

U.S. PATENT DOCUMENTS

| | | |
|---|---|---|
| 5,940,510 A | 8/1999 | Curry et al. |
| 5,949,880 A | 9/1999 | Curry et al. |
| 6,105,013 A | 8/2000 | Curry et al. |

(Continued)

FOREIGN PATENT DOCUMENTS

WO    2006116772 A2    11/2006

OTHER PUBLICATIONS

Gemalto,"Interoperability Specification for ICCs and Personal computer systems," Jun. 3, 2011, pp. 1-8.*

(Continued)

*Primary Examiner* — Pinping Sun
(74) *Attorney, Agent, or Firm* — Troutman Sanders LLP; Christopher J. Forstner; John A. Morrissett

(57) ABSTRACT

A dynamic transaction card including: a printed circuit board (PCB); a power source integrated with the PCB configured to receive power from a smart card terminal, the power source comprising a battery attached to at least one side of the PCB and a capacitor; a power conditioning circuit configured to control power to be stored in the power source; and a power management component connected to the power source, the power management component being configured to manage charging and discharging power to and from the power source.

14 Claims, 7 Drawing Sheets

(56) References Cited

U.S. PATENT DOCUMENTS

| | | | |
|---|---|---|---|
| 6,237,095 B1 | 5/2001 | Curry et al. | |
| 6,812,673 B2 * | 11/2004 | Fujiwara | H02J 7/0031 |
| | | | 320/136 |
| 6,986,965 B2 * | 1/2006 | Jenson | A61N 1/3787 |
| | | | 361/523 |
| 7,216,809 B2 * | 5/2007 | Bertin | G06K 7/0013 |
| | | | 235/380 |
| 7,243,853 B1 | 7/2007 | Levy et al. | |
| 7,318,550 B2 | 1/2008 | Bonalle et al. | |
| 7,483,329 B2 * | 1/2009 | Luo | G11C 5/143 |
| | | | 365/226 |
| 7,587,756 B2 | 9/2009 | Peart et al. | |
| 7,597,265 B2 | 10/2009 | Bonalle et al. | |
| 7,729,986 B1 | 6/2010 | Hoffman et al. | |
| 7,784,687 B2 | 8/2010 | Mullen et al. | |
| 7,784,693 B2 * | 8/2010 | Liao | G06K 19/07769 |
| | | | 235/380 |
| 7,793,845 B2 | 9/2010 | Bonalle et al. | |
| 7,793,851 B2 | 9/2010 | Mullen | |
| 7,798,415 B1 | 9/2010 | Bates et al. | |
| 7,815,126 B2 | 10/2010 | Top | |
| 7,828,220 B2 | 11/2010 | Mullen | |
| 7,874,492 B2 | 1/2011 | Levy et al. | |
| 7,931,195 B2 | 4/2011 | Mullen | |
| 7,946,501 B2 | 5/2011 | Borracci | |
| 7,953,671 B2 | 5/2011 | Bishop et al. | |
| 7,954,705 B2 | 6/2011 | Mullen | |
| 8,011,577 B2 | 9/2011 | Mullen et al. | |
| 8,016,191 B2 | 9/2011 | Bonalle et al. | |
| 8,019,684 B2 | 9/2011 | Hoffman et al. | |
| 8,020,775 B2 | 9/2011 | Mullen et al. | |
| 8,066,191 B1 | 11/2011 | Cloutier et al. | |
| 8,074,877 B2 | 12/2011 | Mullen et al. | |
| 8,078,532 B2 | 12/2011 | Hoffman et al. | |
| 8,082,211 B2 | 12/2011 | Hoffman et al. | |
| 8,095,113 B2 | 1/2012 | Kean et al. | |
| 8,172,148 B1 | 5/2012 | Cloutier et al. | |
| 8,215,563 B2 | 7/2012 | Levy et al. | |
| 8,282,007 B1 | 10/2012 | Cloutier et al. | |
| 8,286,876 B2 | 10/2012 | Mullen et al. | |
| 8,302,872 B2 | 11/2012 | Mullen | |
| 8,308,059 B2 | 11/2012 | Granucci et al. | |
| 8,322,623 B1 | 12/2012 | Mullen et al. | |
| 8,348,172 B1 | 1/2013 | Cloutier et al. | |
| 8,360,322 B2 | 1/2013 | Bonalle et al. | |
| 8,382,000 B2 | 2/2013 | Mullen et al. | |
| 8,393,545 B1 | 3/2013 | Mullen et al. | |
| 8,393,546 B1 | 3/2013 | Yen et al. | |
| 8,413,892 B2 | 4/2013 | Mullen et al. | |
| 8,417,631 B2 | 4/2013 | Hoffman et al. | |
| 8,424,773 B2 | 4/2013 | Mullen et al. | |
| 8,429,085 B2 | 4/2013 | Faith et al. | |
| 8,459,548 B2 | 6/2013 | Mullen et al. | |
| 8,485,437 B2 | 7/2013 | Mullen et al. | |
| 8,485,446 B1 | 7/2013 | Mullen et al. | |
| 8,489,513 B2 | 7/2013 | Bishop et al. | |
| 8,511,574 B1 | 8/2013 | Yen et al. | |
| 8,517,276 B2 | 8/2013 | Mullen et al. | |
| 8,523,059 B1 | 9/2013 | Mullen et al. | |
| 8,561,894 B1 | 10/2013 | Mullen et al. | |
| 8,567,679 B1 | 10/2013 | Mullen et al. | |
| 8,573,503 B1 | 11/2013 | Cloutier et al. | |
| 8,579,203 B1 | 11/2013 | Lambeth et al. | |
| 8,590,796 B1 | 11/2013 | Cloutier et al. | |
| 8,599,572 B2 * | 12/2013 | Neudecker | H01M 6/40 |
| | | | 361/762 |
| 8,602,312 B2 | 12/2013 | Cloutier et al. | |
| 8,608,083 B2 | 12/2013 | Mullen et al. | |
| 8,622,309 B1 | 1/2014 | Mullen et al. | |
| 8,628,022 B1 | 1/2014 | Rhoades et al. | |
| 8,668,143 B2 | 3/2014 | Mullen et al. | |
| 8,674,493 B2 * | 3/2014 | Takayama | G06K 19/077 |
| | | | 257/679 |
| 8,727,219 B1 | 5/2014 | Mullen | |
| 8,733,638 B2 | 5/2014 | Mullen et al. | |
| 8,746,579 B1 | 6/2014 | Cloutier et al. | |
| 8,757,483 B1 | 6/2014 | Mullen et al. | |
| 8,757,499 B2 | 6/2014 | Cloutier et al. | |
| 8,805,746 B2 | 8/2014 | Hoffman et al. | |
| 8,811,959 B2 | 8/2014 | Conner et al. | |
| 8,814,050 B1 | 8/2014 | Mullen et al. | |
| 8,820,638 B1 | 9/2014 | Cotter et al. | |
| 8,827,153 B1 | 9/2014 | Rhoades et al. | |
| 8,870,081 B2 | 10/2014 | Olson et al. | |
| 8,875,999 B2 | 11/2014 | Mullen et al. | |
| 8,876,011 B2 | 11/2014 | Olson et al. | |
| 8,888,009 B1 | 11/2014 | Mullen | |
| 8,931,703 B1 | 1/2015 | Mullen et al. | |
| 8,944,333 B1 | 2/2015 | Mullen et al. | |
| 8,955,744 B2 | 2/2015 | Granucci et al. | |
| 8,960,545 B1 | 2/2015 | Batra | |
| 8,973,824 B2 | 3/2015 | Mullen et al. | |
| 9,095,729 B2 * | 8/2015 | John | A61N 1/3785 |
| 2001/0032666 A1 | 10/2001 | Jenson et al. | |
| 2003/0019942 A1 * | 1/2003 | Blossom | G06K 19/0701 |
| | | | 235/492 |
| 2004/0081860 A1 | 4/2004 | Hundt et al. | |
| 2004/0161640 A1 * | 8/2004 | Salot | H01G 4/40 |
| | | | 429/9 |
| 2005/0139685 A1 * | 6/2005 | Kozlay | G06K 19/07354 |
| | | | 235/492 |
| 2005/0247785 A1 * | 11/2005 | Bertin | G06K 7/0013 |
| | | | 235/441 |
| 2006/0213972 A1 | 9/2006 | Kelly et al. | |
| 2007/0096565 A1 * | 5/2007 | Breed | B60C 23/0408 |
| | | | 307/116 |
| 2008/0319912 A1 * | 12/2008 | Faith | G06Q 20/341 |
| | | | 705/65 |
| 2009/0240625 A1 | 9/2009 | Faith et al. | |
| 2010/0178568 A1 * | 7/2010 | Unalan | B82Y 30/00 |
| | | | 429/317 |
| 2010/0218009 A1 * | 8/2010 | Hoeksel | G06K 19/0701 |
| | | | 713/300 |
| 2011/0208648 A1 | 8/2011 | Alothaimeen | |
| 2012/0032876 A1 * | 2/2012 | Tabe | H04B 1/3838 |
| | | | 345/156 |
| 2012/0109735 A1 | 5/2012 | Krawczewicz et al. | |
| 2012/0254038 A1 | 10/2012 | Mullen | |
| 2012/0297210 A1 * | 11/2012 | Yu | G06F 1/26 |
| | | | 713/300 |
| 2013/0112756 A1 | 5/2013 | Poidomani et al. | |
| 2013/0191288 A1 | 7/2013 | Hoffman et al. | |
| 2013/0217152 A1 | 8/2013 | Mullen et al. | |
| 2013/0218760 A1 | 8/2013 | Faith et al. | |
| 2013/0285606 A1 * | 10/2013 | Ben-Shalom | H01F 38/14 |
| | | | 320/108 |
| 2013/0311363 A1 | 11/2013 | Ramaci et al. | |
| 2013/0320080 A1 | 12/2013 | Olson et al. | |
| 2013/0320081 A1 | 12/2013 | Olson et al. | |
| 2014/0001269 A1 | 1/2014 | Hartwick et al. | |
| 2014/0006277 A1 | 1/2014 | Rao | |
| 2014/0026213 A1 | 1/2014 | Antebi et al. | |
| 2014/0076622 A1 | 3/2014 | Neudecker et al. | |
| 2014/0117094 A1 | 5/2014 | Workley et al. | |
| 2014/0129435 A1 | 5/2014 | Pardo et al. | |
| 2014/0138435 A1 | 5/2014 | Khalid | |
| 2014/0144984 A1 | 5/2014 | Olson et al. | |
| 2014/0164154 A1 | 6/2014 | Ramaci | |
| 2014/0175170 A1 | 6/2014 | Bowers | |
| 2014/0203902 A1 | 7/2014 | Shippee et al. | |
| 2014/0210589 A1 | 7/2014 | Grace | |
| 2014/0233166 A1 | 8/2014 | O'Shea | |
| 2014/0256251 A1 | 9/2014 | Caceres et al. | |
| 2014/0268617 A1 * | 9/2014 | Mehta | H01G 11/24 |
| | | | 361/782 |
| 2014/0279476 A1 | 9/2014 | Hua | |
| 2014/0310184 A1 | 10/2014 | Hoffman et al. | |
| 2014/0339315 A1 | 11/2014 | Ko | |
| 2014/0361888 A1 * | 12/2014 | Huang | G08B 5/36 |
| | | | 340/539.1 |
| 2014/0378004 A1 | 12/2014 | Hashim et al. | |
| 2014/0379583 A1 | 12/2014 | Hoffman et al. | |

(56) References Cited

U.S. PATENT DOCUMENTS

| | | | |
|---|---|---|---|
| 2015/0004934 A1 | 1/2015 | Qian et al. | |
| 2015/0006378 A1 | 1/2015 | Blythe | |
| 2015/0012440 A1 | 1/2015 | Kelley et al. | |
| 2015/0032635 A1 | 1/2015 | Guise | |
| 2015/0073983 A1 | 3/2015 | Bartenstein et al. | |
| 2015/0080077 A1 | 3/2015 | Miller et al. | |
| 2015/0230338 A1* | 8/2015 | Hossain | H05K 3/42 361/762 |
| 2016/0004945 A1* | 1/2016 | Wade | G06K 19/0704 235/492 |
| 2016/0224879 A1* | 8/2016 | Amarnath | G06K 19/07722 |

OTHER PUBLICATIONS

Notification of Transmittal of the International Search Report and the Written Opinion of the International Searching Authority from Application No. PCT/US2016/027526 dated Sep. 1, 2016.
Extended European Search Report in related EP Application No. 16780741.1, dated Dec. 19, 2018.

* cited by examiner

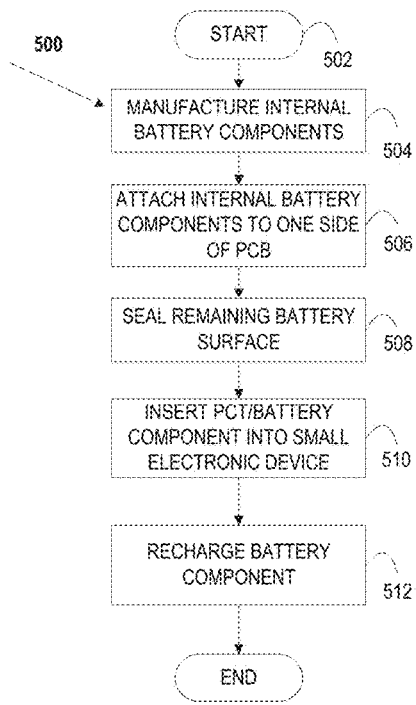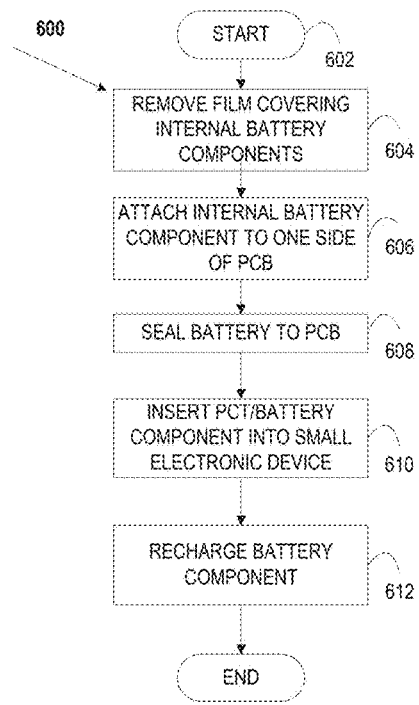
FIGURE 5
FIGURE 6

DYNAMIC TRANSACTION CARD POWER MANAGEMENT

CROSS REFERENCE TO RELATED APPLICATIONS

This application claims the benefit of U.S. Provisional Application No. 62/266,324 entitled "Printed Circuit Board with Integrated Battery" filed Dec. 11, 2015, U.S. Provisional Application No. 62/270,307 entitled "Capacitive Powertrain for a Smart Card" filed Dec. 21, 2015, and U.S. Provisional Application No. 62/305,599 entitled "Smart Card Europay MasterCard Visa ("EMV") Terminal Energy Harvesting" filed Mar. 9, 2016; and U.S. Provisional Application No. 62/147,568 entitled "System Method, and Apparatus for a Dynamic Transaction Card" filed Apr. 14, 2015. The entire contents of these applications are incorporated herein by reference.

This application is related to U.S. application Ser. No. 14/338,423, entitled "System and Method for Exchanging Data with Smart Cards" filed Jul. 23, 2014, which claims the benefit of U.S. Provisional Application No. 61/857,443 filed Jul. 23, 2013. The entire contents of these applications are incorporated herein by reference.

FIELD OF THE DISCLOSURE

The present disclosure relates to a printed circuit board ("PCB") with a power source. As an example, the present disclosure relates to manufacturing a PCB with a power source, which may include removing an aluminum laminate film layer from a battery power source and replacing that layer with one side of a PCB to consume a smaller percentage of space and/or utilizing a rapid energy storage device as a power source to enable a dynamic transaction card to draw the power it needs to communicate with a smartphone via insertion into EMV terminals for payment.

BACKGROUND OF THE DISCLOSURE

The power source utilized to power smaller electronics may dictate the size and shape of the devices, and may often result in long charge times and/or provide relatively slow power delivery.

Batteries may be used to power smaller electronics. However, batteries often consume a large percentage of space in smaller electronic devices, which poses design limitations where a device must be a particular size or shape for user or compatibility purposes (e.g., to fit in the palm of a user's hand, to be compatible with a machine that receives the device, etc.). As such, the placement of components inside an electronic device may dictate the ultimate size or shape of the device.

For example, the majority of smart cards are powered by primary non-rechargeable cells, while a small number are powered by rechargeable secondary cells. Smart cards powered by lithium-ion (Li-Ion) or lithium-polymer (Li-Pol) cells require the use of a standalone charger to charge the smart card. These lithium batteries are recharged via a Constant Current, Constant Voltage (CCCV) process which requires the utilization of a standalone physical charger or charging station for the smart card. CCCV also can require one to five hours on average of charging depending upon the battery capacity, energy density, and chemistry. This current design also requires the use of complicated smart card power management topology.

These and other drawbacks exist.

SUMMARY OF THE DISCLOSURE

Various embodiments of the present disclosure provide a PCB with a power source, which may be integrated into small devices, such as a dynamic transaction card. An EMV terminal may charge or recharge the card when it is inserted into the associated terminal.

As an example, the present disclosure relates to removing an outer film layer from a battery power source and replacing that layer with one side of a PCB. As referred to herein, a battery may be understood to include, for example, a rechargeable battery, such as a lithium ion battery, a lithium-ion polymer battery, a lithium-sulfur battery, a thin film battery, a potassium-ion battery, a oxide semiconductor battery, a thin-film organic solar cell/lithium-polymer battery, and/or the like. A battery may be understood to refer to a battery with a laminate film layer surrounding the battery.

In an example embodiment, a PCB with an integrated battery may be manufactured to attach a battery to one side of a PCB such that the integrated battery covers at least a portion of the PCB side. In an example embodiment, a PCB with an integrated battery may be manufactured to attach a battery to one side of a PCB such that the integrated battery covers the entire surface of the PCB side.

In an example embodiment, a method of manufacturing may include manufacturing the internal battery components without a laminate film, attaching the internal battery components to the PCB such that the PCB acts as a casing to one side of the PCB, and encasing the exposed battery in a thin film covering.

In an example embodiment, a method of manufacturing may include removing the casing of the battery to expose at least one side of the battery, adhering the exposed battery surface to a PCB, and sealing (or ensuring a seal) around the circumference of the connected battery/PCB.

In an example embodiment, the PCB with integrated battery would not exceed approximately 1 mm in thickness. In an example embodiment, the PCB with integrated battery would not exceed approximately 0.80 mm in thickness. In an example embodiment, the PCB with integrated battery would not exceed approximately 0.76 mm in thickness. In an example embodiment, the PCB with integrated battery would not exceed approximately 0.70 mm in thickness.

In an example embodiment, the power source may include an ultracapacitor, which may provide higher energy density fast discharge/charge time, low level of heating, safety, long-term operation stability and no disposable parts. For example, by utilizing an ultracapacitor, a dynamic transaction card may be charged via insertion into EMV terminals for payment, without requiring extra activities from the customer.

Ultracapacitors utilize electrical energy storage technology, which allows ultracapacitors to charge and discharge much faster than batteries. Additionally, because ultracapacitors do not suffer the wear and tear caused by chemical reactions, they may last much longer than batteries, and may not need to be replaced.

As referred to herein, an ultracapacitor may be understood to be readily integrated onto a PCB. An ultracapacitor may be configured to include, two electrodes, which may include porous plates submerged in an electrolyte solution and separated by a thin insulator. The distance between the two charged layers may be measured in nanometers. The porosity of the plates may greatly increase the surface area available for holding charge. A diode in series with an ultracapacitor may be utilized so that the capacitor holds charge by only allowing current flow in one direction.

In an example embodiment, the electrodes may include metal plates coated with a sponge-like porous material. The electrode material may include activated carbon, activated carbon fibers, carbon aerogel, carbide-derived carbon, graphene, carbon nanotubes (CNT) (and their composites, including CNTs/oxide and CNTs/polymer, and a combination of carbon nanotubes with graphene. The electrode may utilize a lithium ion doped carbon nanotube. A combination of carbon nanotubes with graphene may take advantage of the high surface area and in-plane conductivity of the graphene flakes, while the carbon nanotubes may connect all the structures to make a uniform network.

In an example embodiment, a part of the PCB may be used as a part of the capacitor itself so that the capacitor may be printed on the PCB. This may allow for PCB height savings of approximately 7 to 8 mils.

In an example embodiment, an ultracapacitor may include a double layer capacitor. When a potential difference (voltage) is applied across two plates in an ultracapacitor, the charges may line up along both sides of the insulator creating a double, creating two layers of charges, one set of positive and negative charges between an insulator and a negative plate, and a second set between an insulator and a positive plate.

In an example embodiment, the PCB with ultracapacitor would not exceed approximately 1 mm in thickness. In an example embodiment, the PCB with ultracapacitor would not exceed approximately 0.80 mm in thickness. In an example embodiment, the PCB with ultracapacitor would not exceed approximately 0.76 mm in thickness. In an example embodiment, the PCB with ultracapacitor would not exceed approximately 0.70 mm in thickness.

A PCB with power source may be combined into small electronic devices. For example, a PCB with integrated battery may be used in a dynamic transaction card. A dynamic transaction card may include a card described in U.S. Provisional Application No. 62/147,568, filed on Apr. 14, 2015, the entire contents of which are incorporated herein by reference. Accordingly, in an example embodiment, a PCB with integrated battery would not exceed a thickness so as to comply with ISO/IED 7810, ISO 7813, and/or any other standard governing the use of a card that may be used in a transaction.

In an example embodiment, a transaction card may include a transaction card having a number of layers, each of which may be interconnected. For example, a transaction card may include an outer layer, a potting layer, a sensor layer, a display layer (including, for example, LEDs, a dot matrix display, and the like), a microcontroller storing firmware, Java applets, Java applet integration, and the like, an EMV® chip, a PCB with integrated battery, one or more antenna (e.g., BLUETOOTH® antenna, NFC antenna, and the like), a power management component, a chassis, and/or a card backing layer.

In an example embodiment, a system supporting a transaction card may include a transaction card, a mobile device, an EMV terminal, and/or a financial institution system connected over network connections (e.g., Internet, Near Field Communication (NFC), Radio Frequency Identification (RFID), Bluetooth, including Bluetooth Low Energy (BLE) and/or the like). An EMV terminal may include an input slot to receive an EMV card, an EMV reader, a display, a processor, an input/output component, one or more antenna (e.g., antenna supporting NFC, RFID, Bluetooth, WiFi Direct and/or the like), memory, a magnetic stripe reader, and/or the like.

An EMV terminal may charge or recharge an EMV card when the EMV card is inserted into the terminal. A terminal may include, for example, a point-of-sale (PoS) device, an automated teller machine (ATM), a portable reader, and/or the like.

In an example embodiment, a customer may insert an EMV card with a rapid energy storage device into an EMV terminal for less than a minute to get enough power for weeks of usage. Every time a user puts a card into a PoS device, it may also draw power from the PoS device, and contact may be the conduit through which a rapid energy storage device may receive energy. The rapid energy storage device may include an energy storage device capable of accepting a high powered charge current, which may include an ultracapacitor, high charge capable batteries, and/or charge management circuits.

In an example embodiment, when an EMV card is inserted into an EMV terminal, ultracapacitors may access 5V at a current up to 300 mA. After 20 seconds of charging, a Bluetooth enabled EMV card may have enough power to transmit and receive Bluetooth data for 5 minutes, and enough power to stay in sleep mode for days at a time.

Various embodiments of the present disclosure utilize a printed circuit board ("PCB") with a rapid energy storage device. As an example, an rapid energy storage device, which may provide higher energy density fast discharge/charge time compared to lithium-polymer batteries, low level of heating, safety, long-term operation stability and no disposable parts. For example, by utilizing a rapid energy storage device, a dynamic transaction card may be charged via insertion into EMV terminals for payment, without requiring extra activities from the customer.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which:

FIG. 5 depicts an example method for assembling a PCB with an integrated battery according to embodiments of the disclosure;

FIG. 6 depicts an example method for assembling a PCB with an integrated battery according to embodiments of the disclosure;

DETAILED DESCRIPTION OF THE EMBODIMENTS

The following description is intended to convey a thorough understanding of the embodiments described by providing a number of specific example embodiments and details involving a PCB with a power source and methods for manufacturing a PCB with a power source, to enable a dynamic transaction card to draw the power it needs to communicate with a smartphone via insertion into EMV terminals for payment. The associated system may harvest energy from an EMV terminal to charge or recharge a dynamic transaction card when the card is inserted into a terminal. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. A dynamic transaction card and PoS or ATM as a charging station are used as examples for the disclosure. The disclosure is not intended to be limited to dynamic transaction cards or PoS/ATM charging stations only. For example, many other small electronic devices may incorporate a PCB with an power source, and other systems may be used to charge these devices.

Additionally, the use of "mobile device" in the examples throughout this application is only by way of example. Any type of device capable of communicating with a transaction card or using an attached mobile charging device may also be used, including, for example, personal computers, tablets, gaming systems, televisions, or the like.

Figure 1:
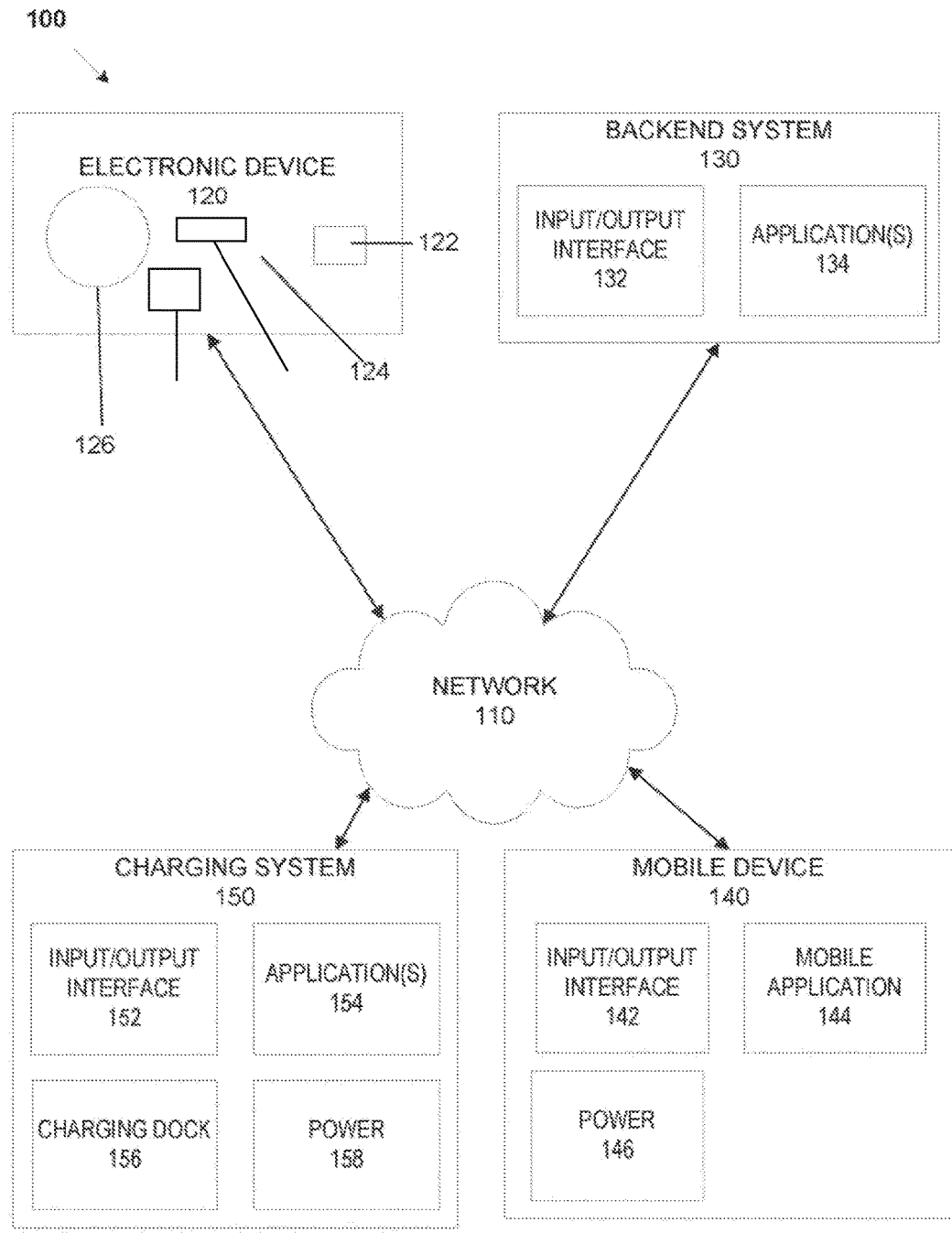
FIG. 1 depicts an example embodiment of a system including an electronic device having a PCB with a power source according to embodiments of the disclosure.

FIG. 1 depicts an example system 100 including an electronic device having a PCB with a power source. As shown in FIG. 1, an example system 100 may include one or more electronic devices 120, one or more backend systems 130, one or more user devices 140, and one or more charging systems 150 connected over one or more networks 110.

For example, network 110 may be one or more of a wireless network, a wired network or any combination of wireless network and wired network. For example, network 110 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, a Bluetooth, BlueSmart, BLE, LE, or SmartCard network, or any other wired or wireless network for transmitting and receiving a data signal.

In addition, network 110 may include, without limitation, telephone lines, fiber optics, IEEE Ethernet 902.3, a wide area network ("WAN"), a local area network ("LAN"), a wireless personal area network ("WPAN"), or a global network such as the Internet. Also network 110 may support an Internet network, a wireless communication network, a cellular network, or the like, or any combination thereof. Network 110 may further include one network, or any number of the example types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

Mobile device 140 and/or charging system 150 may include, for example, one or more mobile devices, such as, for example, personal digital assistants (PDA), tablet computers and/or electronic readers (e.g., iPad, Kindle Fire, Playbook, Touchpad, etc.), wearable devices (e.g., Google Glass), telephony devices, smartphones, cameras, music playing devices (e.g., iPod, etc.), televisions, set-top-box devices, and the like.

Backend system 130, mobile device 140, and/or charging system 150 also may include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. For example, charging system 150 may include components illustrated in FIG. 4.

Backend system 130, mobile device 140, and/or charging system 150 may include at least one central processing unit (CPU), which may be configured to execute computer program instructions to perform various processes and methods. Backend system 130, mobile device 140, and/or charging system 150 may include data storage, including for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include an all flash array, a hybrid array, or a server-side product, enterprise storage, which may include online or cloud storage, or any other storage mechanism.

Backend system 130, mobile device 140, and/or charging system 150 may further include, for example, a processor, which may be several processors, a single processor, or a single device having multiple processors. Although depicted as single elements, it should be appreciated that according to one or more embodiments, backend system 130, mobile device 140, and/or charging system 150 may comprise a plurality of backend systems 130, mobile devices 140, and/or charging systems 150.

Backend system 130, mobile device 140, and/or charging system 150 may further include data storage. The data storage may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include an all flash array, a hybrid array, or a server-side product, enterprise storage, which may include online or cloud storage, or any other storage mechanism.

As shown in FIG. 1, each backend system 130, mobile device 140, and/or charging system 150 may include various components. These components may be understood to refer to computer executable software, firmware, hardware, and/or various combinations thereof. It is noted that where a component includes software and/or firmware, the components is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component.

As depicted in FIG. 1, system 100 may include an electronic device 120 having a PCB. An electronic device 120 may include an electronic display to display alerts, notifications, and/or other output via a display and/or LED lighting 126 and/or receive input to interact with the electronic device 120 via, for example, a sensor 124. Electronic device 120 also may be composed of various materials that enable the entire exterior surface of device 120 to act as a sensor. An electronic device 120 may include any small electronic device having a PCB with a power source, such as, for example, a dynamic transaction card.

An electronic device 120 may be able to communicate with, for example, a mobile device using RFID, Bluetooth, BlueSmart, BLE, LE, SmartCard, NFC, WiFi Direct, and/or other related technologies. For example, communications between an electronic device 120 and a mobile device 140 may include methods, systems, and devices as described in U.S. patent application Ser. No. 14/338,423 filed on Jul. 23, 2014, the entire contents of which are incorporated herein by reference.

An electronic device 120 may be able to communicate with a charging system 150 via contacts 122 (e.g., EMV® chip contacts) located on the electronic device 120. A rapid energy storage device in a smart card (e.g., a dynamic transaction card as described herein) may include pin 1 of standard EMV® card contacts, which may be a power rail, to provide a regulated path 129 to the EMV® terminal voltage source. A smart card reader may deliver power to pin 1. For example, during an EMV® transaction, a customer may insert a smart card into a POS terminal as normal to complete a transaction. While the card is inserted into the terminal, a capacitor may draw up to 2.5 W (5 VDC max at 500 mA) for the duration of the transaction. With two to four daily transactions, for example, a smart card may rely solely on harvesting energy from PoS terminals to remain operational, and may operate normally without the need for a standalone charger.

Figure 2:
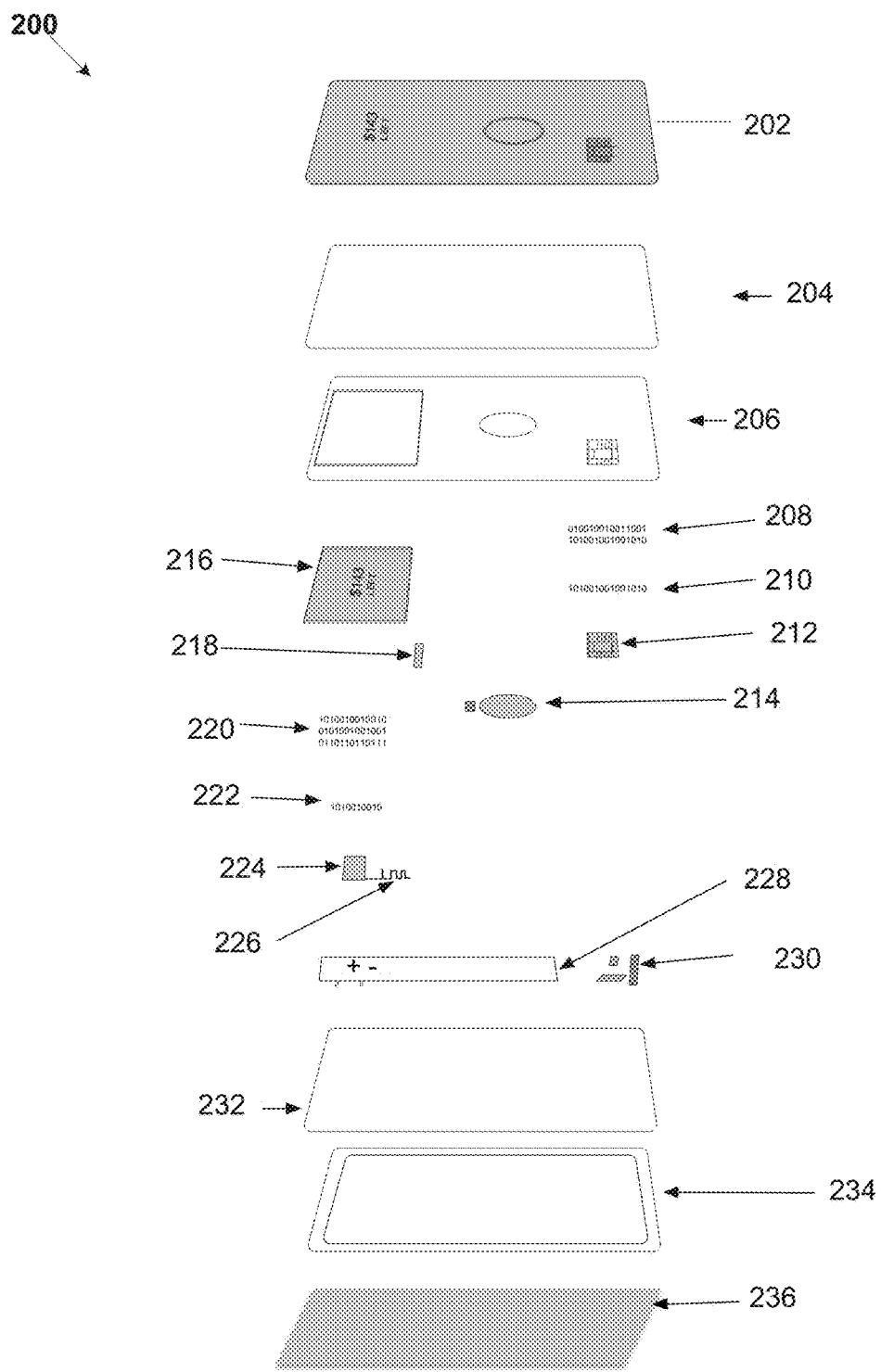
FIG. 2 depicts an example embodiment of a dynamic transaction card having a PCB with a power source according to embodiments of the disclosure.
Figure 3:
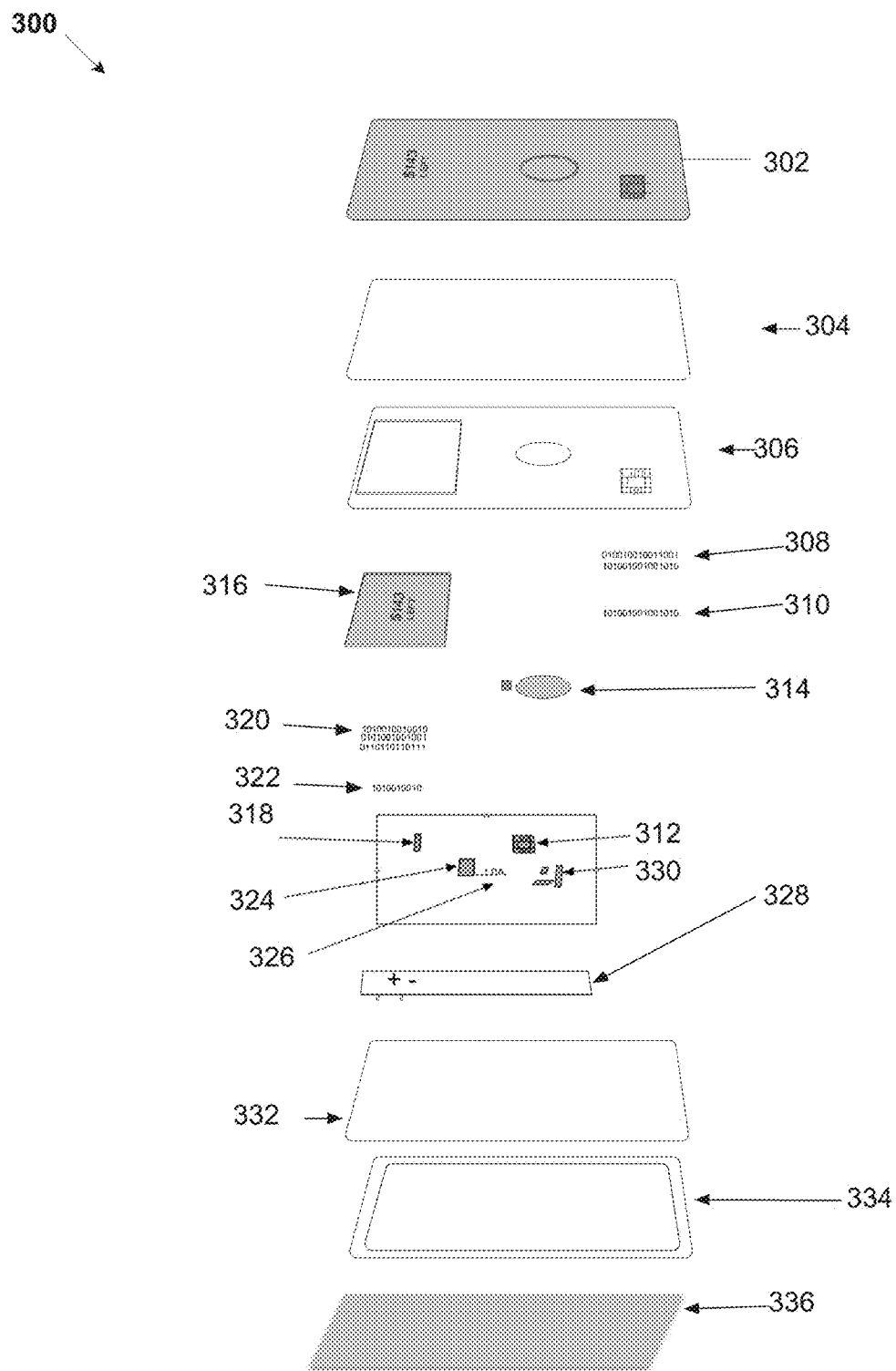
FIG. 3 depicts an example embodiment of a dynamic transaction card having a PCB with a power source according to embodiments of the disclosure.

An electronic device 120 may also include hardware components to provide contactless payments and/or communications. For example, a dynamic transaction card as an electronic device 120 may include an output layer, an outer protective layer, potting, application (e.g., a Java Applet), application integration (e.g., Java Applet integration), an EMV® chip 122, a power conditioning circuit 128, one or more sensors, a display, a display driver, firmware, a bootloader, a microcontroller, one or more antenna, a power source, power management, a flexible PCB, a chassis, and/or card backing as illustrated in FIGS. 2 and 3. An EMV® chip 122 may be embedded in the electronic device 120 may include a number of contacts that may be connected and activated using an interface device.

FIG. 2 depicts an example dynamic transaction card 200 having a PCB with power source. As shown in FIG. 2, dynamic transaction card 200 may include a top output layer 202. The top output layer may be a film covering, a plastic covering, and/or the like. The top output layer 202 may be constructed of scratch-resistant and/or scratch-proof materials. Materials that may be used as a top outer layer 202 may include polyvinyl chloride (PVC), polylactic acid (PLA), acrylonitrile butadiene styrene (ABS), polyethylene terephthalate (PET), Polyethylene terephthalate glycol-modified (PET-G), and/or the like. A dynamic transaction card 200 may further include a top protective layer 204, such as a clear scratch-resistant coating and/or scratch-proof material to protect the underlying components. For example, various scratch-resistant materials include materials coated with a scratch resistant chemical coating, such as a UV curable chemical coating. Scratch-proof materials may include a mineral glass, a sapphire glass material, PVC, PET, and/or PET-G.

A dynamic transaction card may include a potting 206 or filler epoxy around the electrical components to provide strength and/or water resistance. A potting 206 may include a light guide, which may be constructed of optical grade materials such as acrylic, resin, polycarbonate, epoxies, and/or glass. Potting 206 may also include injection molding, such as over molding and/or multi-shot to encapsulate the internal components of card 200. For example, injection molding may include ABS, thermoplastic elastomers (TPE), thermoplastic vulcanizate (TPV), thermoplastic polyurethane (TPU), PET, polycarbonates (PC), and/or silicone.

A dynamic transaction card 200 may further include a Java Applet 208 and Java Applet integration 210. Although a Java Applet 208 is used through the specification, any other similar type of code application may be used. Moreover, although Java Applet integration 210 is used throughout this specification, any type of interface may be used to allow the microcontroller to interact with the EMV chip. A Java Applet 208 may include code that executes payments, such as payment made using an EMV chip. A Java Applet 208 may include account-provider specific code to execute display functionality specific to the account provider. Java Applet integration 210 may include coded interfaces to allow the microcontroller to interact with the EMV chip 212.

An EMV chip 212 may include a number of contacts that may interact with a terminal, such as a charging stations 150. During an EMV interaction, application cryptograms may be used to send and receive data packets between the dynamic transaction card 200 and a terminal. For example, data packets may include user authentication information which an acquisition system and/or issuing financial institution may use to authenticate a transaction card 200 during a transaction. Various cryptographic protocols and/or methods may be used in this data transmission and reception process. Moreover, during a transaction issuing financial institutions and/or acquisition systems may return script commands to the EMV chip 212 via a terminal. These script commands and/or data packets may be transmitted between parties over a network. Script commands may be used, for example, to block transactions, change transaction data stored on the EMV chip (e.g., transaction history, account limits, account balance, and/or the like). Offline data authentication may also take place using, for example public key cryptography to perform payment data authentication. For example, offline data authentication may use Static Data Authentication (SDA), Dynamic Data Authentication (DDA), and/or Combined Data Authentication (CDA).

Dynamic transaction card 200 may also include one or more sensors 214 to receive input. Sensors 214 may include an activation sensor and/or an operation sensor, which may be combined and/or separate. An activation sensor may activate the dynamic transaction card 200 and an operation sensor may instruct the dynamic transaction card 200 to perform an action based on the received input. An activation sensor may require a security input, such as a biometric input (e.g., fingerprint, eye scan, voice recognition, and/or the like), input indicative of a paired mobile device (e.g., BLE and/or Bluetooth pairing), input indicative of a password (e.g., a password received via a sensor on the dynamic transaction card and/or a password received on a paired mobile device), and/or the like. An operation sensor may change a display 216 based on received input, conduct a transaction via, for example an EMV chip 212 and/or contactless payment technologies based on received input, attempt a pairing of a card 200 and a mobile device, and/or the like.

By way of example, a sensor 214 may include a capacitive touch sensor, a piezoelectric sensor, load cells, a light sensor, a temperature sensor, a resistive touchscreen, including for example an analogue matrix real (AMR) sensors, and/or the like. Sensors 214 may include accelerometers to detect motion input.

Although the sensor 214 is depicted at a particular spot in the transaction card 200, a sensor 214 may be placed at any portion of the card to detect, for example, touch, light, heat, energy, and/or the like. For example, a sensor may be placed around the outer edges of a dynamic transaction card 200 or at any spot within the dynamic transaction card 200. Sensor 214 also may include the entire exterior surface of transaction card 200.

A display 216 may be provided within the transaction card 200. Although the display as shown includes, for example, a dot matrix display, a number of other display options may be included in the transaction card 200. For example, lighting, such as LED lighting, OLED lighting, and/or the like, may be used as display components. Display components may also include electronic paper, Mirasol, TF LCD, Quantum Dot Display, and/or the like. Where lighting is used, various lighting technologies may be used to create a display that indicates a number of things to a cardholder. For example, edge lighting may be used to create a specific visual component in the display. A number of LED or OLED lights may be used to illuminate various portions of the display in order to output information to a card holder.

By way of example, a display 216 may be illuminated using a particular color to relay to the cardholder balance information of an account associated with a transaction card, such as an RGB LED matrix panel and/or RGB LED displays. A red light display may indicate that the account balance is within a first predetermined dollar amount or a first predetermined percentage of the total spending limit, a particular budget, a particular budget category, and/or the like. A yellow light display may indicate that the account balance is within a second predetermined dollar amount or a second predetermined percentage of the total spending limit, a particular budget, a particular budget category, and/or the like. A green light display may indicate that the account balance is within a third predetermined dollar amount or a third predetermined percentage of the total spending limit, a particular budget, a particular budget category, and/or the like. Various colors and or number of categories may be used to output this information to a cardholder. A display 216 may include other display component, such as, for example, LCD technology, ePaper technology (e.g., e-ink), vacuum florescent display technology, EL (electroluminescent), and/or the like.

By way of example, a display may include a number of LED or OLED lights that may be lit in a particular pattern to indicate transaction and/or account information. For example, a display may include a circle, semicircle, or other shape of LED or OLED lighting, where the number of lights illuminated indicates a dollar amount or a percentage of the total spending limit, a particular budget, a particular budget category, and/or the like.

A display may be altered and/or modified, for example, for example, where dynamic transaction card 200 includes a debit account, a first credit account, and a second credit account, display components 216 may reflect the card number, security code, expiration date, and/or other necessary data indicative of the account (e.g., second credit account) that is being used to execute a transaction. A display may be altered and/or modified when, for example, a dynamic transaction card 200 receives new card data and/or new account data from an account holder's mobile device via a wireless connection. For example, where an account has been marked as associated with fraudulent activity, an account holder and/or issuing financial institution may deactivate the card associated with the account and issue a new card. Accordingly, new card data may be transmitted from the issuing financial institution to, for example, an account holder's mobile device via a network, and then from an account holder's mobile device to electronic card 200 via a wireless connection. A display may also be altered and/or modified when electronic card 200 activates a new account. For example, when an account holder applies for a new account (e.g., a new credit card account, a new checking account, and/or the like), if approved, new account data may be transmitted to electronic card 200. New account data may be received at an account holder's mobile device from an issuing financial institution via a network (e.g., using a mobile application, mobile optimized website, and/or the like). New account data may then be transmitted from an account holder's mobile device to electronic card 200 via a wireless connection (e.g., BLE, RFID, NFC, WiFi, and/or the like) or a contact connection (e.g., using a terminal in contact with an EMV chip and/or other microchip).

A dynamic transaction card 200 may include a display driver 218 that translates instructions from a microcontroller 224 into display images to be displayed using display components 216. A display driver 218 may include an integrated circuit (IC), a state machine, and/or the like that provides an interface function between the display and the microcontroller 224. A display driver 218 may include memory (e.g., RAM, Flash, ROM, and/or the like) and/or firmware that includes font display data.

A dynamic transaction card 200 may include firmware 220 and/or a bootloader 222. A bootloader 222 may include code to be executed as an electronic card 200 is activated and before any operating system, firmware, or other code is executed on the dynamic transaction card 200. A bootloader may be activated via a sensor 214 and power source 228 of the dynamic transaction card 200. Bootloader 222 may be activated and/or load an application and/or program upon detection that card 200 has been inserted into a terminal, charger, and/or the like. Bootloader 222 may be activated using only one technique described herein, using multiple techniques described herein, and/or using a card holder or card provider selected technique(s) described herein. Bootloader 222 may only be active during a short interval after the card 200 powers up. Card 200 may also be activated using program code that may be flashed directly to a microprocessor such as microcontroller 224, EMV chip 212, and/or the like. Card 200 may not use a bootloader 222 but instead may cycle between a sleep state and an active state using program code and/or memory.

A dynamic transaction card 200 may include a microcontroller 224 and an antenna 226. Antenna 226 may include, for example, a loop antenna, a fractal antenna, and/or the like. Antenna 226 may transmit to and receive signals from a mobile device, such as mobile device 140, to conduct transactions and display data as described throughout the specification. Microcontroller 224 may communicate with EMV chip 212, Java Applet 208, Java Applet integration 210, sensor(s) 214, power management 230, antenna 226, power source 228, display 216, display driver 218, firmware 220, bootloader 222, and/or any other component of dynamic transaction card 200. Microcontroller 224 may control the card operations to conduct transactions and/or display data as described throughout this specification.

Dynamic transaction card 200 may include a power source component 228 that is integrated in a PCB 232. By way of example, power source component 228 may include an integrated battery, which may include a lithium polymer batter, a lithium-metal battery, a lithium-ceramic battery, and/or any other type of battery. Power source component 228 may also include a rapid energy storage device, which may include an energy storage device capable of accepting a high power charge current. For example, a rapid energy storage device that provides for quick energy harvesting may include an ultracapacitor, which may include an electrostatic double-layer capacitor, an electrochemical pseudo capacitor, a hybrid capacitor, and/or any other type of ultracapacitor. A rapid energy storage device may also include high charge capable batteries, charge management circuits. A rapid energy storage device may include a standard ISO compliant EMV contact interface. Power source component 228 may also include a hybrid ultracapacitor and high charge battery arrangement, which may include an ultracapacitor that provides for quick energy harvesting, and a battery, such as a lithium polymer battery, a lithium metal battery, lithium ceramic battery, and/or any other type of battery that is charged offline.

Although power source component is depicted as a single component separated from PCB 232, as described herein power source component 228 is manufactured to be integrated with PCB 232 such that the internal power source components lie directly on PCB 232 and PCB 232 acts as a covering for the internal power source components. Power source 228 may be constructed out of rigid materials, semi-flexible materials, and/or flexible materials. Power source Power source 228 may provide power to card components contained within dynamic transaction card 200. Power source component 228 may be a combine battery/potting component to support dynamic transaction card 200. In an example embodiment, dynamic transaction card 200 may include a power conditioning circuit which withdraws power from the power source to power a dynamic transaction card. A power conditioning circuit may control the amount of power delivered to the dynamic transaction card so as not to overcharge the card.

Dynamic transaction card 200 may include a power management component 230 that may manage the charging and discharging of power source 228. Power management 230 may include preinstalled firmware. Additionally specific pins on the EMV chip may be configured to charge specific amounts and specific times. Power management component 230 may convert voltage to a predetermined level in order to operate dynamic transaction card 200 as discussed throughout the specification. Power management component 230 and/or power source 228 may include, for example, solar power cells to convert solar energy into an electrical current within a solar panel. Power management component 230 and/or power source 228 may include connections to sensors 214 to receive input and activate dynamic transaction card 200 (e.g., motion input, thermal input, manual input, touch input, and/or the like).

A flexible printed circuit board (PCB) 232 may be included in dynamic transaction card 200. As discussed with reference to FIGS. 5 and 6, for example, electronic devices, such as dynamic transaction card 200 may include a PCB with an integrated battery, such as power source 228 and power management component 230. As discussed with reference to FIG. 7, for example, electronic devices, such as dynamic transaction card 200 may include a PCB with an ultracapacitor, such as power source 228 and power management component 230. A flexible PCB 232 may include a PCB mounted in a flexible plastic substrate, such as for example, a polyimide, polyether ether ketone, and/or a transparent conductive polyester film. A flexible PCB 232 may be printed, using, for example screen printing, 3D printing, and/or the like, to arrange circuits on a material, such as polyester. Flexible PCB 232 may include electronic components and connections that power dynamic transaction card 200 as described in FIGS. 5 and 6. Flexible PCB 232 may control and/or provide integration between the components of card 200. For example, flexible PCB 232 mechanically supports and electronically connects the electronic components of card 200 using, for example, conductive tracks, pads, and/or other features. A flexible printed circuit (FPC) may be used in place of or in conjunction with flexible PCB 232. FPC 232 may be fabricated with photolithographic technology, such as light exposure of a film material laminated to substrate and/or conductive layers. FPC 232 may be printed, silkscreened, and/or the like. FPC 232 may be used as a structural member for the electronic components of card 200 and/or for the card system as a whole 200.

Dynamic transaction card 200 may include a chassis 234 as a frame or supporting structure. Chassis 234 may be a mount for a flexible PCB 232 with a power source 228/230 and may be constructed out of flexible or semi-flexible material as well. Chassis 234 may be constructed out of a number of materials, including but not limited to, styrene, polycarbonate, polyester and PET. Chassis 234 may be constructed out of a conductive material. Chassis 234 may increase the rigidity of dynamic transaction card 200 to prevent damage. Chassis 234 may also be used to detect if dynamic transaction card 200 is being held by including sensors 214 around chassis 234. Where chassis 234 is constructed out of a conductive material, a dielectric constant of chassis 234 and/or card 200 may be monitored to detect handling of card 200. Chassis 234 may be included within or separate from a card backing 236. Card backing 236 may include a magnetic stripe that may be read using a magnetic stripe reader. A magnetic strip may store tracks of data that are used to conduct a transaction using a dynamic transaction card 200. The tracks of data may include a first track capable of storing alphanumeric characters as well as symbols (e.g., ?, !, &, #, and/or the like), such as account numbers, account holder name, expiration data, security data, and/or other account and/or card related data. The tracks of data may include a second track capable of storing numeric characters such as account numbers, expiration data, security data, and/or other account and/or card related data. The tracks of data may include a third track of data capable of storing numeric characters such as an account number, a PIN, a country code, a currency code, an authorization amount, a balance amount, and/or other account and/or card related data.

A magnetic stripe may be dynamically altered. For example, a dynamic transaction card 200 that is paired to a mobile device via, for example, Bluetooth, BLE, BlueSmart, LE, SmartCard, RFID, and/or other wireless technologies, may receive new track data. The new track data may be unformatted, encrypted, encoded, and/or the like when the new track data is transmitted from the mobile device to the dynamic transaction card 200. Upon receipt of the new track data, the new track data may be routed to a microprocessor, such as EMV chip 212 and/or microcontroller 224. EMV chip 212 and/or microcontroller 224 may convert, decrypt, and/or decode the received new track data to ensure compliance with any standards. Once decrypted, decoded, and/or formatted, the new track data may be save on the tracks of the magnetic stripe. The magnetic stripe may be deleted and then the new track data may be recorded onto the tracks. In this manner, track data stored on a magnetic stripe may be altered at any time upon pairing a dynamic transaction card 200 with a mobile device.

Card backing 236 may be made of similar material to that of the output layer 202 and/or the top protective layer 204. Card backing 236 may be made out of a plastic material.

Figure 7:
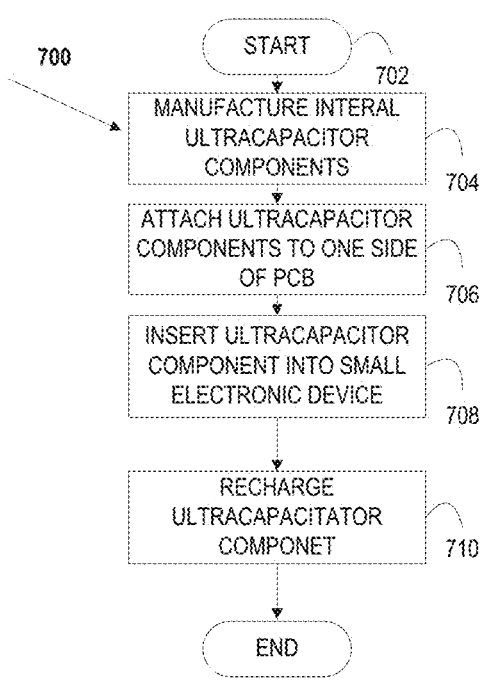
FIG. 7 depicts an example method for assembling a PCB with an ultracapacitor according to embodiments of the disclosure.

Although the components of dynamic transaction card 200 are illustrated in a particular fashion, these components may be combined and or placed throughout a dynamic transaction card 200 in any manner, such as those depicted in, for example, FIG. 3 and described in FIGS. 5, 6, and 7.

For example, FIG. 3 illustrates an electric transaction card having an output layer 302 which may be similar to output layer 202; an outer protective layer 304 which may be similar to outer protective layer 204; potting 306 which may be similar to potting 206; Java Applets 308 which may be similar to Java Applets 208; Java Applet integration 310 which may be similar to Java Applet integration 210; an EMV chip 312 which may be similar to EMV chip 212; a sensor 314 which may be similar to sensor 214; display 316 which may be similar to display 216; display driver 318 which may be similar to display driver 218; firmware 320 which may be similar to firmware 220; bootloader 322 which may be similar to bootloader 222; microcontroller 324 which may be similar to microcontroller 224; antenna 326 which may be similar to antenna 226; power source 328 which may be similar to power source 228; power management 330 which may be similar to power management 230; a flexible PCB 332 which may be similar to flexible PCB 232; chassis 334 which may be similar to chassis 234; and/or card backing 336 which may be similar to card backing 236.

Figure 8:
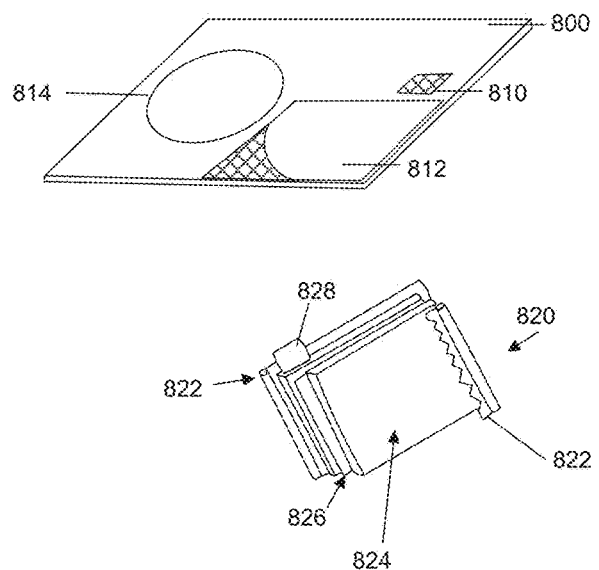
FIG. 8 depicts example embodiment of a dynamic transaction card having a PCB with an power source according to embodiments of the disclosure.

A PCB with a power source may be arranged within a dynamic transaction card, such as, for example, dynamic transaction card 800 illustrated in FIG. 8, which may be similar to dynamic transaction card 200 or dynamic transaction card 300, as illustrated in FIGS. 2 and 3. FIG. 8 illustrates the top side, component layer of dynamic transaction card 800. For example, a dynamic transaction card 800 may include an exposed negative terminal 810 positioned on a top layer of the dynamic transaction card, and a card display 814. Dynamic transaction card 800 may include a PCB with a power source where an exposed plane of the PCB is positioned on a top layer of the dynamic transaction card. An exposed plane of the PCB 812 may include a copper power plane. An exposed plane of the PCB may include 45 degree hatched traces. 45 degree hatched traces may be included to provide a flexible plane of the PCB. Dynamic transaction card 800 may also include a card display positioned on a top layer of the electronic card.

A PCB with a power source may include power source 820. FIG. 8 illustrates a cross-section of power source 820. Power source 820 may include an integrated battery, a rapid energy storage device, which may include an ultracapacitor, high charge capable batteries or charge management circuits, and/or a hybrid ultracapacitor and high charge battery arrangement. Power source 820 may include an exposed negative terminal 828 and a positive electrode 824, where a negative terminal 828 and a positive electrode 824 may be divided by a separator 826. Power source 820 may also include a laminate film 822 covering at least a portion of the power source as disclosed herein. A PCB with a power source may be manufactured by bonding a power source electrode to a copper plane of the PCB.

For example, an ultracapacitor may be utilized as a power source, and is not vulnerable to overcharging because once the ultracapacitor has been fully charged, the current through the capacitor drops normally. As such, the associated power management topology of power management component 330 may be simplified, as the ultracapacitor does not require over voltage protection or charge termination. Because the ultracapacitor will not be overcharged, multiple charge schemes are not required, as the ultracapacitor voltage increases linearly when constant current is applied, and does not require an additional constant voltage charge cycle.

Returning to FIG. 1, backend system 130 may include a backend system that communicates with electronic device 120. For example, where electronic device 120 is a dynamic transaction card, backend system 130 may be a system associated with, for example, a banking service company such as CAPITAL ONE®, BANK OF AMERICA®, CITIBANK®, WELLS FARGO®, SUN TRUST®, various community banks, and the like, as well as a number of other financial institutions such as VISA®, MASTERCARD®, and AMERICAN EXPRESS® that issue credit and/or debit cards, for example, as transaction cards. In this example, backend system 130 may include and/or be connected to one or more computer systems and networks to process transactions.

Where an electronic device 120 is associated with a dynamic transaction card, backend system 130 may include systems associated with financial institutions that issue transaction cards and maintains a contract with cardholders for repayment. In various embodiments, an backend system 130 may issue a dynamic transaction card. Backend 130 may include, by way of example and not limitation, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions (e.g., investment banks, underwriters, brokerage funds, etc.), electronics companies (e.g., electronics manufacturers, software providers, etc.), and other non-bank financial institutions (e.g., pawn shops or brokers, cashier's check issuers, insurance firms, check-cashing locations, payday lending, currency exchanges, microloan organizations, crowd-funding or crowd-sourcing entities, third-party payment processors, etc.).

Backend system 130 may include, among other components, an input/output interface 132 and various applications 134 that run the hardware included in backend system 130. Input/output interface 132 may include for example, I/O devices, which may be configured to provide input and/or output to/from backend system 130 (e.g., keyboard, mouse, display, speakers, printers, modems, network cards, etc.). Input/output interface 132 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of backend system 130, and a bus that allows communication among the various components of backend system 130. Input/output interface 132 may include a display, which may include for example output devices, such as a printer, display screen (e.g., monitor, television, and the like), speakers, projector, and the like. Although not shown, each backend system 130 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Applications 134 may include various hardware and software components to communicate between an electronic device 120, charging system 150, and/or mobile device 140 in order to send/receive data and execute functionality associate with electronic device 120. For example, where electronic device 120 is a dynamic transaction card, applications 134 may be used to process a transaction using the dynamic transaction card. Backend system 130 may also include various hardware and software components, such as data storage (not shown) to store data associated with an electronic device 120. For example, when an electronic device 120 is a dynamic transaction card, backend system 130 may store a card number, account type, account balance, account limits, budget data, recent transactions, pairing data such as time and date of pairing with a mobile device, and the like and/or cardholder data such as a cardholder name, address, phone number(s), email address, demographic data, and the like.

Applications 134 may include various hardware and software components to communicate between an electronic device 120, charging system 150, and/or mobile device 140 in order to send/receive data and execute functionality associate with electronic device 120. For example, where electronic device 120 is a dynamic transaction card, applications 134 may be used to process a transaction using the dynamic transaction card.

A mobile device 140 may be any device capable of communicating with an electronic device 120 via, for example, BLUETOOTH®, BlueSmart, BLE, LE, or SmartCard technology, NFC technology, WiFi Direct technology, and/or the like. For example, user device 140 could be an IPHONE®, IPOD®, IPAD®, and/or APPLE WATCH® from Apple® or any other mobile device running Apple's iOS operating system, any device running Google's ANDROID® operating system, including, for example, smartphones running the ANDROID® operating system and other wearable mobile devices, such as Google Glass or SAMSUNG GALAXY GEAR® Smartwatch, any device running MICROSOFT WINDOWS® Mobile operating system, and/or any other smartphone or like device.

Mobile device 140 may include for example, an input/output interface 142, a mobile application 144, and a power component 146. Input/output interface 142 may include, for example, a Bluetooth, BLE, LE, SmartCard, RFID, and/or NFC interface or chipset with a Bluetooth/RFID/NFC transceiver, a chip, and an antenna. The transceiver may transmit and receive information via the antenna and an interface. The chip may include a microprocessor that stores and processes information specific to a dynamic transaction card and provides device control functionality. Device control functionality may include connection creation, frequency-hopping sequence selection and timing, power control, security control, polling, packet processing, and the like. The device control functionality and other Bluetooth/RFID/NFC-related functionality may be supported using a Bluetooth/RFID/NFC API provided by the platform associated with the mobile device 140 (e.g., The Android platform, the iOS platform). Using a Bluetooth/RFID/NFC API, an application stored on a mobile device 140 (e.g., a banking application, a financial account application, etc.) or the device may be able to scan for other Bluetooth/RFID/NFC devices (e.g., an electronic device 120), query the local Bluetooth/RFID/NFC adapter for paired Bluetooth/RFID/NFC devices, establish RFCOMM channels, connect to other devices through service discovery, transfer data to and from other devices (e.g., electronic device 120) and manage multiple connections. A Bluetooth API used in the methods, systems, and devices described herein may include an API for Bluetooth Low Energy (BLE) to provide significantly lower power consumption and allow a mobile device 140 to communicate with BLE devices that have low power requirements, such electronic device 120.

Input/output interface 142 may include for example, I/O devices, which may be configured to provide input and/or output to mobile device 140 (e.g., keyboard, mouse, display, speakers, printers, modems, network cards, etc.). Input/output interface 142 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of mobile device 140, and a bus that allows communication among the various components of mobile device 140. Input/output interface 142 may include a display, which may include for example output devices, such as a printer, display screen (e.g., monitor, television, and the like), speakers, projector, and the like. Although not shown, each mobile device 140 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Input/output interface 142 may also include an NFC antenna and secure element (SE). The SE may be a hardware chip specially designed to be tamper proof. In one embodiment, the SE may be used for digitally and physically secure storage of sensitive data. For example, SE may be used to store transaction card data, payment data, health records, car key identifiers, etc. The SE may, for example, store information related to a person, customer, financial institution, or other entity. The SE may store information related to a financial account, such as, for example, transaction card data (e.g., a credit card number, debit account number, or other account identifier, account balance, transaction history, account limits, budget data, recent transactions, and/or the like). The SE may include a computer processor or other computational hardware or software. As one example, the secure element may contain the Visa® and MasterCard® applications for PayWave® and PayPass® transactions. A secure element may take the form of a universal integrated circuit card (UICC) and/or a microSD card. A UICC may identify a user to a wireless operator, store contacts, enable secure connections, and add new applications and services, such as a transaction system.

Input/output interface 142 may enable Industry Standard NFC Payment Transmission. For example, the input/output interface 142 may enable two loop antennas to form an air-core transformer when placed near one another by using magnetic induction. Input/output interface 142 may operate at 13.56 MHz or any other acceptable frequency. Also, input/output interface 142 may provide for a passive communication mode, where the initiator device provides a carrier field, permitting answers by the target device via modulation of existing fields. Additionally, input/output interface 142 also may provide for an active communication mode by allowing alternate field generation by the initiator and target devices.

Input/output interface 142 may deactivate the RF field while awaiting data. The attachment may use Miller-type coding with varying modulations, including 100% modulation. The attachment may also use Manchester coding with varying modulations, including a modulation ratio of 10%. Additionally, the attachment may be capable of receiving and transmitting data at the same time, as well as checking for potential collisions when the transmitted signal and received signal frequencies differ.

Input/output interface 142 may be capable of utilizing standardized transmission protocols, for example but not by way of limitation, ISO/IEC 14443 A/B, ISO/IEC 18092, MiFare, FeliCa, tag/smartcard emulation, and the like. Also, input/output interface 142 may be able to utilize transmission protocols and methods that are developed in the future using other frequencies or modes of transmission. Input/output interface 142 may also be backwards-compatible with existing techniques, for example RFID. Also, the system may support transmission requirements to meet new and evolving standards including internet based transmission triggered by NFC.

Mobile applications 144 may include software and hardware components that work with input/output interface 142 to generate and receive account data associated with an electronic device 120. For example, applications 144 may include various hardware and software components such as a processor and data storage to store data associated with electronic device 120. For example, where an electronic device 120 is a dynamic transaction card, data may include a cardholder name, address, phone number(s), email address, demographic data, card number, account type, account balance, account limits, budget data, recent transactions and the like.

Applications 144 may also facilitate the operation of mobile device 140. For example, mobile device 140 may include an operating system such as, for example, the iOS operating system from Apple, the Google Android operating system, and the Windows Mobile operating system from Microsoft. Mobile device 140 may also include, without limitation, software applications 144 such as mobile banking applications or financial institution applications to facilitate use of an electronic device 120, an NFC application programming interface, and software to enable touch sensitive displays. Applications 144 may include software stacks or Application Programming Interfaces (APIs) which allow software applications to be written on top of the software stacks. For example, mobile device manufacturers may provide, without limitation, a card emulation API to enable NFC card emulation mode, a logic link control protocol (LLCP) API for peer-to-peer communication between mobile devices, a Bluetooth API supporting BLE, and a real-time data (RTD) API and a NFC Data Exchange Format (NDEF) API for reading/writing.

Software applications 144 on mobile device 140, such as mobile banking applications and applications associated with electronic device 120, may include on/off features that allow a user associated with a mobile device 140 to enable and disable an electronic device 120. For example, where electronic device 120 is a dynamic transaction card, a card holder may use, for example, a mobile banking application stored on a mobile device 140 to disable and/or enable accounts associated with a dynamic transaction card 120.

Charging system 150 may include, among other components, an input/output interface 152, application(s) 154, a charging dock 156, and a power component 158. As illustrated and described in FIG. 4, for example, a PoS device may act as a charging station 150. Charging system 150 may also include data storage (not shown) to store data associated with the electronic device 120.

An input/output interface 152 may include, for example, a transceiver, modems, network interfaces, buses, CD-ROM, keyboard, mouse, microphone, camera, touch screen, printers, USB flash drives, speakers, and/or any other device configured to receive and transmit electronic data. Input/output interface 152 may include for example, I/O devices, which may be configured to provide input and/or output to and/or from charging 150 (e.g., keyboard, mouse, display, speakers, printers, modems, network cards, etc.). Input/output interface 152 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of charging system 150, and a bus that allows communication among the various components of charging system 150. Input/output interface 152 may include a display, which may include for example output devices, such as a printer, display screen (e.g., monitor, television, and the like), speakers, projector, and the like. Although not shown, charging system 150 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Applications 154 may include various software and/or hardware component to enable charging system 150 to charge and/or interact with an electronic device 120 inserted in a charging dock 156 or otherwise in communication with charging system 150 (e.g., Bluetooth, BLE, LE, SmartCard, RFID, NFC, etc.). Charging dock 156 may include a slot or connection port (not shown) to enable the charging system 150 to connect to electronic device 120 (e.g., via contacts 122) in order to charge a PCB with an integrated battery within electronic device 120. For example, where charging station 150 is a PoS device or ATM, charging dock 156 may include a slot that allows a dynamic transaction card to be inserted whereby the slot includes a contact to connect with the contacts of chip 122. In this manner, the charging dock 156 may connect to the electronic device 120 to charge the PCB with an integrated battery. For example, when a user puts a dynamic transaction card into a PoS device, the dynamic transaction card may also draw power from the PoS device, which supplies power to the contact on the dynamic transaction card, which is transmitted to the card and stored in an energy storage component. This dynamic transaction card by draw power from a PoS device while a transaction associated with the card is processing.

Charging system 150 may also include a power component 158. Power component 158 may include a microcontroller or integrated circuit that governs power functions of charging system 150. Power component 158 may include a main battery or power source. Power component 158 also may include, for example, firmware, software, memory, a CPU, a CPU, input/output functions, timers to measure intervals of time, as well as analog to digital converters to measure the voltages of the main battery or power source of charging system 150. In various embodiments, power component 158 remain active even when charging system 150 is completely shut down, unused, and/or powered by the backup power source. Power component 158 may be responsible for coordinating many functions, including, for example, monitoring power connections and power source charges, charging batteries when necessary, controlling power to other integrated circuits within charging system 150 and/or other peripherals and/or readers, shutting down unnecessary system components when they are left idle, controlling sleep and power functions (on and off), managing the interface for built-in keypad and trackpads, and/or regulating a real-time clock (RTC).

Figure 4:
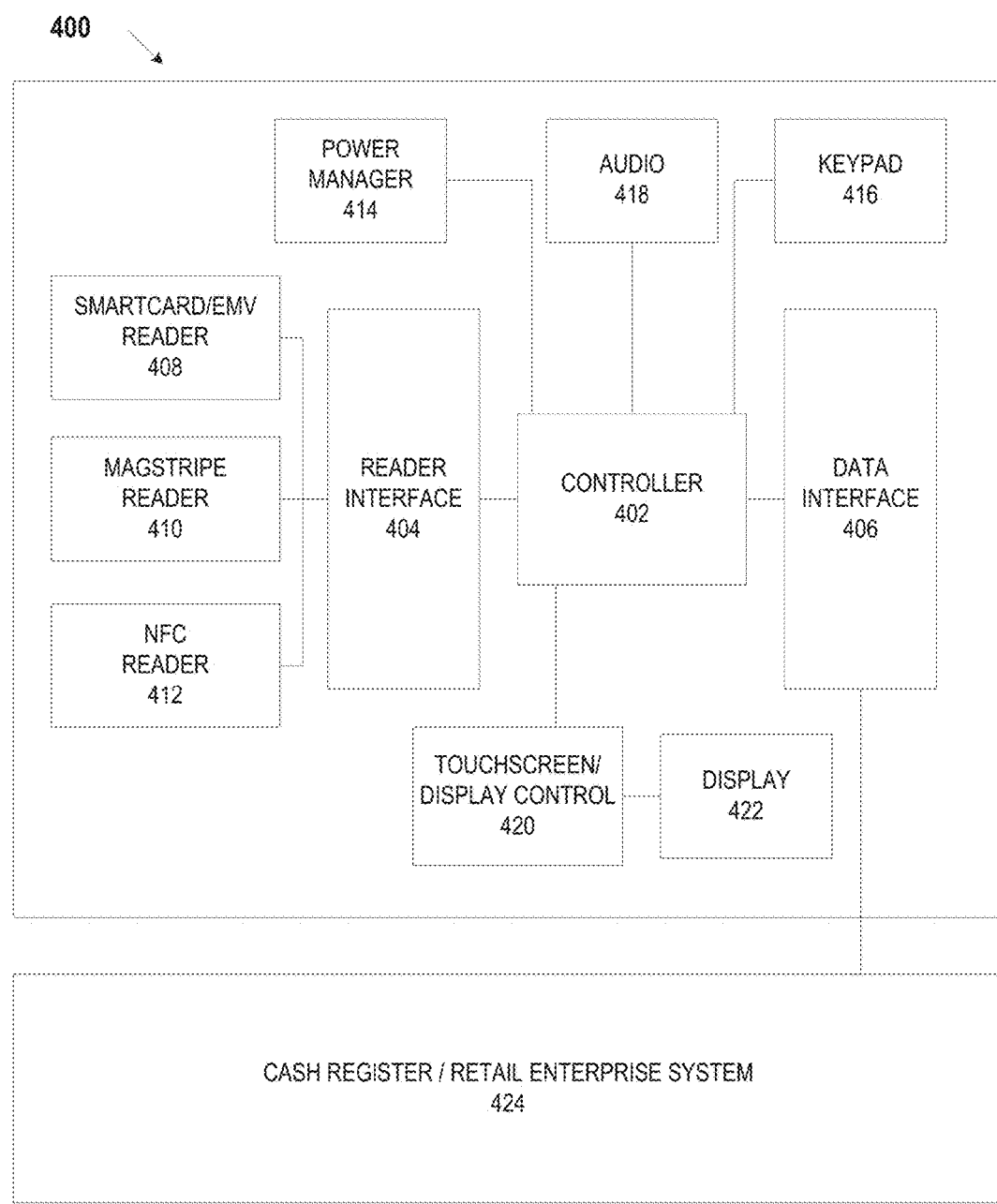
FIG. 4 depicts an example PoS system as a charging station for an electronic device having a PCB with a power source according to embodiments of the disclosure.

FIG. 4 depicts an example PoS device 400 as a charging system, which may be similar to charging system 150. PoS device 400 may provide the interface at what a card holder makes a payment to the merchant in exchange for goods or services. PoS device 400 may include and/or cooperate with weighing scales, scanners, electronic and manual cash registers, electronic funds transfer at point of sale (EFTPOS) terminals, touch screens and any other wide variety of hardware and software available for use with PoS device 400. PoS device 400 may be a retail point of sale system and may include a cash register and/or cash register-like computer components to enable purchase transactions. PoS device 400 also may be a hospitality point of sale system and include computerized systems incorporating registers, computers and peripheral equipment, usually on a computer network to be used in restaurant, hair salons, hotels or the like.

PoS device 400 may be a wireless point of sale device similar to a PoS device described herein or, for example a tablet computer that is configured to operate as a PoS device, including for example, software to cause the tablet computer to execute point of sale functionality and a card reader such as for example the Capital One® SparkPay card reader, the Square® reader, Intuit's® GoPayment reader, or the like. In this example, PoS device 400 may be connected to a mobile device such that the mobile device may act as a charging system 150. A mobile device may include, for example, mobile device 140. PoS device 400 also may be a cloud-based point of sale system that can be deployed as software as a service, which can be accessed directly from the Internet using, for example, an Internet browser.

Referring to FIG. 4, an example PoS device 400 is shown. PoS device 400 may include a controller 402, a reader interface 404, a data interface 406, a smartcard and/or EMV chip reader 408, a magnetic stripe reader 410, a near-field communications (NFC) reader 412, a power manager 414, a keypad 416, an audio interface 418, a touchscreen/display controller 420, and a display 422. Also, PoS device 400 may be coupled with, integrated into or otherwise connected with a cash register/retail enterprise system 424.

In an example embodiment, a customer may insert an EMV card with a rapid energy storage device into an EMV terminal for less than a minute to get enough power for weeks of usage. Every time a user puts a card into a PoS device, it may also draw power from the PoS device, and contact may be the conduit through which a rapid energy storage device may receive energy. When a card is inserted into an EMV terminal, the terminal may recognize the EMV chip and may turn on power to be transmitted to the dynamic transaction card.

In various embodiments, Controller 402 may be any controller or processor capable of controlling the operations of PoS device 400. For example, controller 402 may be an Intel® 2nd Generation Core™ i3 or i5 or Pentium™ G850 processor or the like. Controller 402 also may be a controller included in a personal computer, smartphone device, tablet PC or the like.

Reader interface 404 may provide an interface between the various reader devices associated with PoS device 400 and PoS device 400. For example, reader interface 404 may provide an interface between smartcard and/or EMV chip reader 408, magnetic stripe reader 410, NFC reader 412 and controller 402. In various embodiments, reader interface 404 may be a wired interface such as a USB, RS232 or RS485 interface and the like. Reader interface 404 also may be a wireless interface and implement technologies such as Bluetooth, BlueSmart, BLE, LE, or SmartCard, the 802.11(x) wireless specifications and the like. Reader interface 404 may enable communication of information read by the various reader devices from the various reader devices to PoS device 400 to enable transactions. For example, reader interface 404 may enable communication of a credit or debit card number read by a reader device from that device to PoS device 400. In various embodiments, reader interface 404 may interface between PoS device 400 and other devices that do not necessarily "read" information but instead receive information from other devices.

Data interface 406 may allow PoS device 400 to pass communicate data throughout PoS device and with other devices including, for example, cash register/retail enterprise system 424. Data interface 406 may enable PoS device 400 to integrate with various customer resource management (CRM) and/or enterprise resource management (ERP) systems. Data interface 406 may include hardware, firmware and software that make aspects of data interface 406 a wired interface. Data interface 406 also may include hardware, firmware and software that make aspects of data interface 406 a wireless interface. In various embodiments, data interface 406 also enables communication between PoS device other devices.

Smartcard and/or EMV chip reader 408 may be any electronic data input device that connects to the contacts of an EMV chip on a transaction card. Through these connections EMV chip reader 408 may transmit power to the transaction card, read data from a dynamic transaction card and/or EMV chip, and send data to the dynamic transaction card and/or EMV chip. Smartcard and/or EMV chip reader 408 may be capable of supplying an integrated circuit (e.g., EMV chip) on the dynamic transaction card with electricity and communicating with the dynamic transaction card via protocols, thereby enabling read and write functions. In various embodiments, smartcard and/or EMV chip reader 408 may enable reading from contact or contactless dynamic transaction cards. Smartcard and/or EMV chip reader 408 also may communicate using standard protocols including ISO/IEC 7816, ISO/IEC 14443 and/or the like or proprietary protocols.

Magnetic stripe reader 410 may be any electronic data input device that reads data from a magnetic stripe on a transaction card, for example. In various embodiments, magnetic stripe reader 410 may include a magnetic reading head capable of reading information from a magnetic stripe. Magnetic stripe reader 410 may be capable of reading, for example, cardholder information from tracks 1, 2, and 3 on magnetic cards. In various embodiments, track 1 may be written on a card with code known as DEC SIXBIT plus odd parity and the information on track 1 may be contained in several formats (e.g., format A, which may be reserved for proprietary use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus 1 parity). Track 3 may be unused on the magnetic stripe. In various embodiments, track 3 transmission channels may be used for transmitting dynamic data packet information to further enable enhanced token-based payments.

NFC reader 412 may be any electronic data input device that reads data from a NFC device. In an example embodiment, NFC reader 412 may enable Industry Standard NFC Payment Transmission. For example, the NFC reader 412 may communicate with a NFC enabled device to enable two loop antennas to form an air-core transformer when placed near one another by using magnetic induction. NFC reader 412 may operate at 13.56 MHz or any other acceptable frequency. Also, NFC reader 412 may enable a passive communication mode, where an initiator device provides a carrier field, permitting answers by the target device via modulation of existing fields. Additionally, NFC reader 412 also may enable an active communication mode by allowing alternate field generation by the initiator and target devices.

In various embodiments, NFC reader 412 may deactivate an RF field while awaiting data. NFC reader 412 may receive communications containing Miller-type coding with varying modulations, including 100% modulation. NFC reader 412 also may receive communications containing Manchester coding with varying modulations, including a modulation ratio of approximately 10%, for example. Additionally, NFC reader 412 may be capable of receiving and transmitting data at the same time, as well as checking for potential collisions when the transmitted signal and received signal frequencies differ.

NFC reader 412 may be capable of utilizing standardized transmission protocols, for example but not by way of limitation, ISO/IEC 14443 A/B, ISO/IEC 18092, MiFare, FeliCa, tag/smartcard emulation, and the like. Also, NFC reader 412 may be able to utilize transmission protocols and methods that are developed in the future using other frequencies or modes of transmission. NFC reader 412 also may be backwards-compatible with existing payment techniques, such as, for example RFID. Also, NFC reader 412 may support transmission requirements to meet new and evolving payment standards including internet based transmission triggered by NFC. In various embodiments, NFC reader 412 may utilize MasterCard's® PayPass and/or Visa's® PayWave and/or American Express'® ExpressPay systems to enable transactions.

Although not shown and described, other input devices and/or readers, such as for example, barcode readers and the like are contemplated.

Power manager 414 may be any microcontroller or integrated circuit that governs power functions of PoS device 400. Power manager 414 may include, for example, firmware, software, memory, a CPU, a CPU, input/output functions, timers to measure intervals of time, as well as analog to digital converters to measure the voltages of the main battery or power source of PoS device 400. In various embodiments, Power manager 414 remain active even when PoS device 400 is completely shut down, unused, and/or powered by the backup power source. Power manager 414 may be responsible for coordinating many functions, including, for example, monitoring power connections and power source charges, charging power sources when necessary, controlling power to other integrated circuits within PoS device 400 and/or other peripherals and/or readers, shutting down unnecessary system components when they are left idle, controlling sleep and power functions (on and off), managing the interface for built-in keypad and trackpads, and/or regulating a real-time clock (RTC).

Power manager 214 may include firmware that may automatically set a charging mode based on a physical connection between a dynamic transaction card and a power source, which may include fast charging (via utilization of EMV terminal transactions) and slow charging (via utilization of a standalone charger). When a dynamic transaction card is inserted into an EMV terminal, a connection between the EMV terminal and the pins may automatically activate the fast charging of the dynamic transaction card. When a dynamic transaction card is connected to a standalone charger, the connection may automatically activate the slow charging of the dynamic transaction card. In another example, dynamic transaction card may be configured such that fast charging via EMV terminal transactions may be turned on and off by a user of the card. The associated code may be in flash, and as such, a dynamic transaction card may be restored when charged.

Keypad 416 may any input device that includes a set of buttons arranged, for example, in a block or pad and may bear digits, symbols and/or alphabetical letters. Keypad 416 may be a hardware-based or mechanical-type keypad and/or implemented in software and displayed on, for example, a screen or touch screen to form a keypad. Keypad 416 may receive input from a user that pushed or otherwise activates one or more buttons on keypad 416 to provide input.

Audio interface 418 may be any device capable of providing audio signals from PoS device 400. For example, audio interface may be a speaker or speakers that may produce audio signals. In various embodiments, audio interface 418 may be integrated within PoS device 400. Audio interface 418 also may include components that are external to PoS device 400.

Touchscreen/display control 420 may be any device or controller that controls an electronic visual display. Touchscreen/display control 420 may allow a user to interact with PoS device 400 through simple or multi-touch gestures by touching a screen or display (e.g., display 422). Touchscreen/display control 420 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, touchscreen/display control 420 may receive inputs from the touchscreen and process the received inputs. Touchscreen/display control 420 also may control the display on PoS device 400, thereby providing the graphical user interface on a display to a user of PoS device 400.

Display 422 may be any display suitable for a PoS device. For example, display 422 may be a TFT, LCD, LED or other display. Display 422 also may be a touchscreen display that for example allows a user to interact with PoS device 400 through simple or multi-touch gestures by touching a screen or display (e.g., display 422). Display 422 may include any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, 422 may receive inputs from control gestures provided by a user. Display 422 also may display images, thereby providing the graphical user interface to a user of PoS device 400.

Cash register/retail enterprise system 424 may me any device or devices that cooperate with PoS device 400 to process transactions. Cash register/retail enterprise system 424 may be coupled with other components of PoS device 400 via, for example, a data interface (e.g., data interface 406) as illustrated in FIG. 4. Cash register/retail enterprise system 424 also may be integrated into PoS device 400.

In various embodiments, cash register/retail enterprise system 424 may be a cash register. Example cash registers may include, for example, mechanical or electronic devices that calculate and record sales transactions. Cash registers also may include a cash drawer for storing cash and may be capable of printing receipts. Cash registers also may be connected to a network to enable payment transactions. Cash registers may include a numerical pad, QWERTY or custom keyboard, touch screen interface, or a combination of these input methods for a cashier to enter products and fees by hand and access information necessary to complete the sale.

In various embodiments, cash register/retail enterprise system 424 may comprise an retail enterprise system and/or a customer relationship management system. Retail enterprise system 424 may enable retain enterprises to manage operations and performance across a retail operation. Retail enterprise system 424 may be a stand-alone application in, for example, individual stores, or may be interconnected via a network. Retail enterprise system 424 may include various point of sale capabilities, including the ability to, for example, customize and resize transaction screens, work with a "touch screen" graphical user interface, enter line items, automatically look up price (sales, quantity discount, promotional, price levels), automatically compute tax, VAT, look up quantity and item attribute, display item picture, extended description, and sub-descriptions, establish default shipping services, select shipping carrier and calculate shipping charges by weight/value, support multi-tender transactions, including cash, check, credit card, and debit card, accept food stamps, place transactions on hold and recall, perform voids and returns at PoS, access online credit card authorizations and capture electronic signatures, integrate debit and credit card processing, ensure optional credit card discounts with address verification, support mix-and-match pricing structure, discount entire sale or selected items at time of sale, add customer account, track customer information, including total sales, number of visits, and last visit date. issue store credit, receive payment(s) for individual invoices, process deposits on orders, search by customer's ship-to address, create and process layaway, back orders, work orders, and sales quotes, credit items sold to selected sales reps, view daily sales graph at the PoS, view and print journals from any register, preview, search, and print journals by register, batch, and/or receipt number, print X, Z, and ZZ reports, print receipts, invoices, and pick tickets with logos/graphics, print kit components on receipt, reprint receipts, enter employee hours with an integrated time clock function, and/or sell when the network/server is down with an offline PoS mode. Retail enterprise system 424 also may include inventory control and tracking capabilities, reporting tools, customer management capabilities, employee management tools, and may integrate with other accounting software.

In various embodiments cash register/retail enterprise system 424 may be a hospitality PoS. In such embodiments, retail enterprise system 424 may include hospitality PoS software (e.g., Aloha PoS Restaurant software from NCR®, Micros® RES and Symphony software and the like), hospitality management software, and other hardware and software to facilitate hospitality operations.

FIGS. 5 and 6 illustrate example methods of manufacturing a PCB with an integrated battery component.

The method 500 may start at block 502. At block 504, the internal components of the battery may be manufactured at block 504. For example, battery components of an electronic device such as a dynamic transaction card may include power source 228, 328 and power management component 230, 330. Once manufactured, the internal battery components may be placed on one side of a PCB, such as PCB 232, 322 in block 506. In an example embodiment, the components are placed on the PCB such that anode layer of the battery is directly adjacent to the PCB surface. In an example embodiment, the components are placed on the PCB such that the cathode layer of the battery is directly adjacent to the PCB surface. For example, an electrode of the battery may be bonded to a copper plane of the PCB.

At block 508, the battery components that have been placed on the PCB may be sealed. For example, using reaction injection molding (RIM), a polymer gel, and/or a heat-sealed envelope (e.g., an aluminum laminate film), the remaining sides of the battery not covered by the PCB may be sealed to contain the battery components. Other processes for sealing the battery include using an adhesive, cold lamination, polyurethane, an epoxy, ultrasonic welding, thermosonic welding, and/or a conductive epoxy.

At block 510, the PCB and battery combination may be inserted into a small electronic device. For example, a PCB with integrated battery may be inserted into a dynamic transaction card such as dynamic transaction card 200, 300. In an example embodiment, a PCB with integrated battery would not exceed approximately 1 mm in thickness. In an example embodiment, the PCB with integrated battery would not exceed approximately 0.80 mm in thickness. In an example embodiment, the PCB with integrated battery would not exceed approximately 0.76 mm in thickness. In an example embodiment, the PCB with integrated battery would not exceed approximately 70 mm in thickness. Once all components are inserted into a small electronic device, the small electronic device may be used and recharged.

For example, at block 512, the small electronic device may be recharged using, for example, charging system 150. A charging system may include a terminal that may connect with the small electronic device via, for example, a USB port, a micro-USB port, an integrated circuit contact port, a wireless charging port, and/or the like. For example, as described herein, a charging system may include a PoS device, an ATM, and/or a mobile PoS device that may include contacts to connect with an EMV chip in a dynamic transaction card.

In an example embodiment, method 600 may start at block 602. At block 604, a film, envelope, and/or other covering of a battery may be removed. Removal may include complete removal or partial removal that exposes only the portion of a battery that may be attached to a PCB. At block 606, unsealed battery components may be attached to one side of a PCB to integrate the battery with the PCB. In an example embodiment, the components are placed on the PCB such that anode layer of the battery is directly adjacent to the PCB surface. In an example embodiment, the components are placed on the PCB such that the cathode layer of the battery is directly adjacent to the PCB surface. For example, an electrode of the battery may be bonded to a copper plane of the PCB.

At block 608, the battery components may be sealed to the PCB. If the entire film, envelope and/or other covering were removed, sealing may include using RIM, a polymer gel, and/or a heat-sealed envelope (e.g., an aluminum laminate film) to enclose the remaining sides of the battery not covered by the PCB. If a partial removal method is used, the battery may be sealed to the PCB using a polymer gel and/or RIM. Other processes for sealing the battery include using an adhesive, cold lamination, polyurethane, an epoxy, ultrasonic welding, thermosonic welding, and/or a conductive epoxy.

At block 610, the PCB and battery combination may be inserted into a small electronic device. For example, a PCB with integrated battery may be inserted into a dynamic transaction card such as dynamic transaction card 200, 300. In an example embodiment, a PCB with integrated battery would not exceed approximately 1 mm in thickness. In an example embodiment, the PCB with integrated battery would not exceed approximately 0.80 mm in thickness. In an example embodiment, the PCB with integrated battery would not exceed approximately 0.76 mm in thickness. In an example embodiment, the PCB with integrated battery would not exceed approximately 0.70 mm in thickness. Once all components are inserted into a small electronic device, the small electronic device may be used and recharged.

For example, at block 612, the small electronic device may be recharged using, for example, charging system 150. A charging system may include a terminal that may connect with the small electronic via, for example, a USB port, a micro-USB port, an integrated circuit contact port, a wireless charging port, and/or the like. For example, as described herein, a charging system may include a PoS device, an ATM, and/or a mobile PoS device that may include contacts to connect with an EMV chip in a dynamic transaction card.

FIG. 7 illustrates an example method of manufacturing a PCB with an ultracapacitor component.

The method 700 may start at block 702. At block 704, the internal components of the ultracapacitor may be manufactured at block 704. For example, ultracapacitor components of an electronic device such as a dynamic transaction card may include power source 228, 328, which may include an ultracapacitor, and power management component 230, 330. Once manufactured, the ultracapacitor components may be placed on one side of a PCB, such as PCB 232, 322 in block 706.

At block 708, the PCB and ultracapacitor combination may be inserted into a small electronic device. For example, a PCB with an ultracapacitor may be inserted into a dynamic transaction card such as dynamic transaction card 200, 300. In an example embodiment, a PCB with an ultracapacitor would not exceed 1 mm in thickness. In an example embodiment, the PCB with an ultracapacitor would not exceed 0.80 mm in thickness. In an example embodiment, the PCB with an ultracapacitor would not exceed 0.76 mm in thickness. In an example embodiment, the PCB with an ultracapacitor would not exceed 0.70 mm in thickness. Once all components are inserted into a small electronic device, the small electronic device may be used and recharged.

For example, at block 710, the small electronic device may be recharged using, for example, charging system 150. A charging system may include a terminal that may connect with the small electronic via, for example, a USB port, a micro-USB port, an integrated circuit contact port, a wireless charging port, and/or the like. For example, as described herein, a charging system may include a PoS device, an ATM, and/or a mobile PoS device that may include contacts to connect with an EMV chip in a dynamic transaction card.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A dynamic transaction card comprising:
    a printed circuit board (PCB) having a capacitor printed thereon;
    a power source integrated on the PCB, the power source being configured to receive power from a smart card terminal, the power source comprising a battery and the capacitor, the battery being attached to the PCB, wherein a combination of the power source and the PCB has a thickness less than 0.70 mm;
    a power conditioning circuit configured to control the power to be stored in the power source;
    a power management circuit connected to the power source, the power management circuit being configured to manage charging and discharging of the power to and from the power source; and
    an activation sensor connected to the power management circuit, the activation sensor being configured to:
        receive an input indicative of a paired wireless mobile device and an input indicative of a password; and
        activate, in response to receiving the input indicative of the paired wireless mobile device and the input indicative of the password, the power management circuit to manage the charging and the discharging of the power to and from the power source.

2. The dynamic transaction card of claim 1, wherein the capacitor comprises an ultracapacitor.

3. The dynamic transaction card of claim 1, wherein the power source comprises a hybrid arrangement of an ultracapacitor and the battery.

4. The dynamic transaction card of claim 1, wherein the power management circuit is further configured to manage the charging and the discharging of the power to and from the power source only in response to being activated by the activation sensor.

5. The dynamic transaction card of claim 1, wherein the activation sensor is positioned at an outer edge of the dynamic transaction card.

6. A system comprising:
    a dynamic transaction card powered by a rapid energy storage device, the dynamic transaction card comprising:
        a printed circuit board (PCB);
        a smart card contact plate interface;
        a power conditioning circuit configured to withdraw power from the rapid energy storage device to power the dynamic transaction card;
        a power management circuit connected to the rapid energy storage device, which manages charging and discharging of the rapid energy storage device; and
    a smart card terminal; and
        an activation sensor connected to the power management circuit, the activation sensor being configured to:
            receive an input indicative of a paired wireless mobile device and an input indicative of a password; and
            activate, in response to receiving the input indicative of the paired wireless mobile device and the input indicative of the password, the power management circuit to manage the charging and the discharging of the rapid energy storage device;

wherein the rapid energy storage device comprises a regulated path to a smart card terminal voltage source, and receives the power from the smart card terminal, and wherein the rapid energy storage device comprises a battery attached to the PCB and a capacitor printed on the PCB, a combination of the battery and the PCB having a thickness of less than 0.70 mm.

7. The system of claim 6, wherein the power management circuit comprises firmware that automatically sets a charging mode based on a physical connection between the dynamic transaction card and a power source.

8. The system of claim 6, wherein the rapid energy storage device comprises an ultracapacitor.

9. The system of claim 6, wherein the battery comprises at least one from among a lithium polymer battery, a lithium metal battery, and a lithium ceramic battery.

10. The system of claim 6, wherein the rapid energy storage device comprises a charge management circuit.

11. The system of claim 6, wherein the rapid energy storage device comprises a hybrid arrangement of an ultracapacitor and the battery.

12. The system of claim 6, wherein:
the rapid energy device comprises a first pin of a smart card contact; and
the first pin comprises the regulated path to the smart card terminal voltage source, and receives the power from a dynamic transaction card reader.

13. A dynamic transaction card comprising:
a printed circuit board (PCB);
a power source integrated on the PCB configured to receive power from a smart-card terminal, the power source comprising a battery attached to the PCB and a capacitor printed on the PCB;
a power conditioning circuit configured to control the power to be stored in the power source;
a power management circuit connected to the power source, the power management circuit being configured to manage charging and discharging of the power to and from the power source; and
an activation sensor connected to the power management circuit, the activation sensor being configured to:
receive an input indicative of a paired wireless mobile device and an input indicative of a password; and
activate, in response to receiving the input indicative of the paired wireless mobile device and the input indicative of the password, the power management circuit to manage the charging and the discharging of the power to and from the power source.

14. The dynamic transaction card of claim 13, wherein the capacitor is configured to swiftly draw the power from a transaction terminal connected to the dynamic transaction card, and
the power conditioning circuit is configured to control the power to be stored in the battery from the capacitor while the dynamic transaction card is disconnected from the transaction terminal.

* * * * *